(No Model.)

C. M. TRAUTMANN.
Velocipede.

No. 229,562. Patented July 6, 1880.

Attest:
Collin Ford Jr.
Frank F. Hardy.

Inventor:
Charles M. Trautmann,
By John W. Hill,
Attorney.

UNITED STATES PATENT OFFICE.

CHARLES M. TRAUTMANN, OF SOUTH BEND, ASSIGNOR TO THE FARMER'S FRIEND MANUFACTURING COMPANY, OF CINCINNATI, OHIO.

VELOCIPEDE.

SPECIFICATION forming part of Letters Patent No. 229,562, dated July 6, 1880.

Application filed May 10, 1880. (No model.)

*To all whom it may concern:*

Be it known that I, CHARLES M. TRAUTMANN, of South Bend, in the county of Hamilton and State of Ohio, have invented certain new and useful Improvements in Velocipedes, of which the following is a specification.

My invention is in the nature of an improvement upon that class of velocipedes where the weight of the rider is caused to assist in the propulsion of the vehicle; and it consists, first, in constructing and combining the upright vibrating hand and foot lever, which, by means of a pitman, gives motion to the driving-wheel, and an oscillating seat for the rider in such a manner that the motion of the limbs and body of the rider shall be unconstrained and natural while propelling the machine; and, second, in constructing and arranging the steering-gear in such a manner that by an easy and graceful twist of the hand-gripes the guiding-wheel may be revolved in either direction to steer the vehicle.

In all machines of this class which have been heretofore invented the motions of the rider are neither easy nor graceful, and the labor of working the vehicle is correspondingly laborious.

Figure 1:
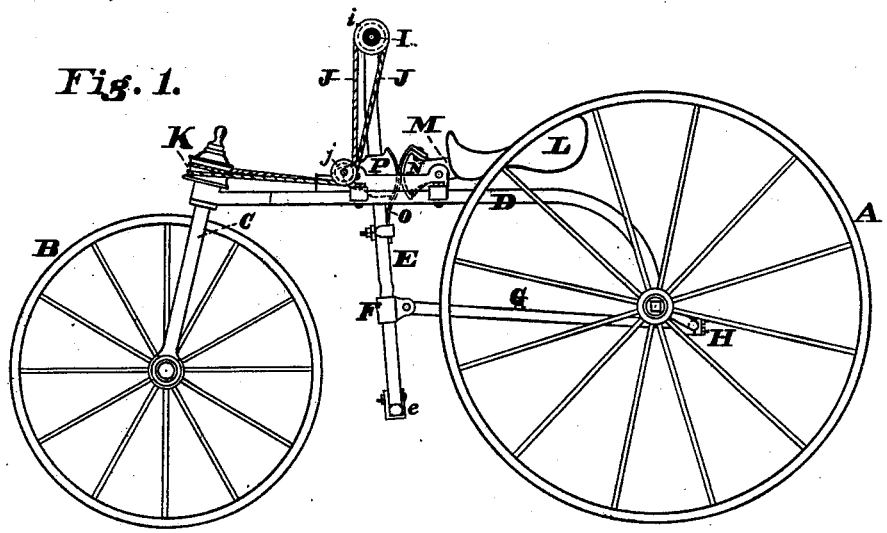
Figure 2:
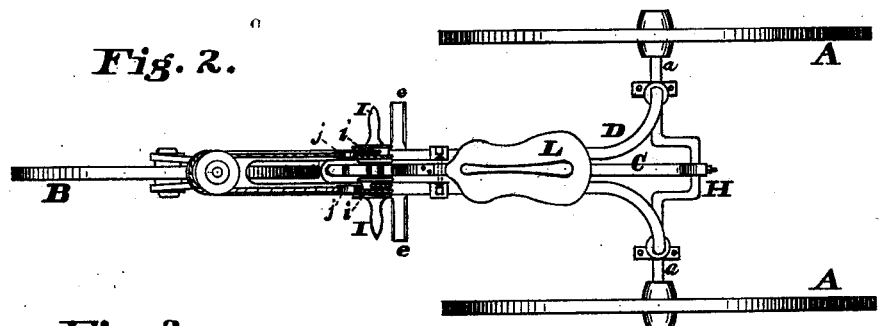
Figure 3:
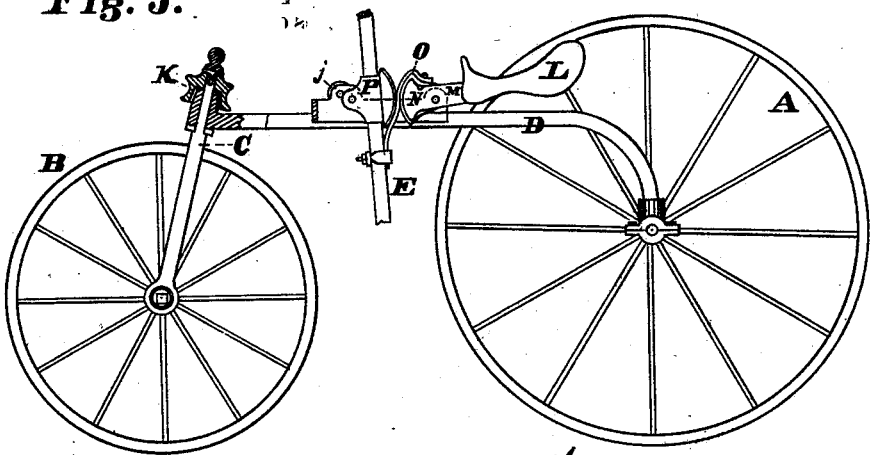

In the accompanying drawings, Figure 1 is an elevation of a three-wheeled velocipede containing my improvement. Fig. 2 is a plan thereof; and Fig. 3 is a detached view of a portion of the machine, showing the manner of connecting the oscillating driver's seat and the vibrating hand and foot lever.

Similar letters of reference indicate corresponding parts.

A is the driving-wheel, rigidly secured to the axle *a*. B is the guiding-wheel, pivoted in the bifurcated standard C. D is the reach or frame, which may consist of one or two members, extending from the standard C to and embracing, in suitable journal-boxes, the axle *a*. The standard C is pivoted in the forward end of the reach D.

E is the vibrating hand and foot lever, pivoted, near the center of its length, to the reach or frame D, and carrying at the lower end the foot-rests *e e*.

F is a block rigidly secured to the lever E, and provided with a pair of jaws projecting rearwardly for the reception of the forward end of the pitman G. The rear end of the pitman is connected to the crank H, formed by bending the axle *a*.

I I are a pair of turned handles, mounted on a suitable shaft at the upper end of the vibrating lever E. Each of the handles I I is provided with a spool, *i*, of larger diameter than the handle, upon which the steering ropes or wires J J are wound and secured.

The wires or ropes J J, as will be observed in Fig. 2, are wound in opposite directions upon the spools, so that by turning the handles from the rider or toward the rider the ropes or wires will coil on one spool and uncoil from the other spool.

The ropes J J pass downward from the spools *i i* around the guide-pulleys *j j* and forward to the spool K, around which the wire or rope is coiled, and to which it is secured. The spool K is firmly secured to the head of the standard C, and any motion of the spool K, by reason of the ropes or wires J J being drawn in either direction, is communicated to the guiding-wheel B through the standard C.

L is a seat or saddle secured to the oscillating lever M, pivoted near its front end to the frame or reach D. To the forward end of the lever M is secured a block, N, of sectoral shape, to the upper surface of which is attached one end of a stout strap, of leather or other suitable material, O. The strap O passes downward, and is firmly secured to the vibrating lever E. Upon the lever E, opposite the block N, a similar sectoral block, P, is secured.

The form and position of the curved blocks N and P are such that as the strap O is drawn off the face or working-surface of either it is drawn on the face of the opposite block.

The operation of the machine is as follows: The rider, having taken his seat in the saddle L, places his feet on the rests *e e* and grasps the handles I I. If the vibrating lever E happen to be at or near the middle position and the crank H down, then by pushing on the handles I I the vibrating lever E is thrust toward the guiding-wheel B, the pitman G is driven back, and the driving-wheel revolved in a direction to urge the vehicle forward. At the same time the vibrating lever E is moving forward under the impulse of the rider's hands it is also being forced in the same direction by the descent of the saddle L, the weight of the rider being communicated to the lever E by means of the oscillating lever M and the strap O. When the forward motion of the lever E is completed the rider presses the lower end of the lever from him by his feet, and draws the upper end toward him with his hands. Meanwhile the saddle L rises to its highest position by the time the vibrating lever E has been drawn fully back. The alternate push and pull on the handles I I and the intermittent pressure of the rider's feet on the rests e e, together with the rise and fall of the saddle L, give a vibratory motion to the lever, which motion is communicated to axle a of the vehicle by means of the pitman G and crank H. The guiding-wheel B is turned to the right or left by the revolution of the handles I I toward or from the rider.

In three or four wheeled velocipedes only one of the driving-wheels A is secured to the axle a, the opposite wheel turning loosely on the axle to facilitate the changing of the course of the vehicle to the right or left.

I am aware that the devices herein described for propelling velocipedes by the weight of the rider acting in conjunction with the movement of the hands and feet are the subject of Letters Patent for drag-saws, granted to one Daniel Heller December 6, 1870, and reissued July 22, 1879, and that the use of two steering wires or ropes running back from the standard of a steering-wheel to the rider's hands is not new, and these I do not claim.

Having described my invention, what I claim is—

1. In velocipedes propelled partly by the weight of the rider, the combination of the vibrating lever E, having handles I I and foot-rests e e, with the oscillating lever M, saddle L, blocks N and P, and strap O, for the purpose and as described.

2. In a velocipede, the combination, with the rear driving-wheels and the axle having the crank H, and with the frame D, connecting the driving-wheels and front steering-wheel, of the pitman G, attached to the said crank, the pivoted vibrating lever E, attached at its lower end to said pitman and having foot-rests e e, and handles I I, substantially as shown and described.

3. The combination of the standard C, carrying the steering-wheel and extending through the front end of the frame D, with the spool K, fixed to the projecting end of said standard, the ropes J J passing around said spool and under the pulleys j j, and connected with the spools i i, all substantially as and for the purpose described.

In testimony whereof I have signed my name to the foregoing specification in the presence of two subscribing witnesses.

CHARLES M. TRAUTMANN.

Witnesses:
 COLLIN FORD, Jr.,
 EDGAR J. GROSS.